(12) United States Patent
Tanaka

(10) Patent No.: US 10,027,826 B2
(45) Date of Patent: Jul. 17, 2018

(54) IMAGE FORMING SYSTEM, NON-TRANSITORY COMPUTER READABLE MEDIUM, AND IMAGE FORMING METHOD

(71) Applicant: FUJI XEROX CO., LTD., Tokyo (JP)

(72) Inventor: Tomonori Tanaka, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/446,399

(22) Filed: Mar. 1, 2017

(65) Prior Publication Data

US 2018/0091668 A1    Mar. 29, 2018

(30) Foreign Application Priority Data

Sep. 26, 2016 (JP) ................................ 2016-187433

(51) Int. Cl.
*G06F 15/00* (2006.01)
*H04N 1/00* (2006.01)

(52) U.S. Cl.
CPC ..... *H04N 1/00498* (2013.01); *H04N 1/00384* (2013.01); *H04N 1/00413* (2013.01); *H04N 1/00506* (2013.01); *H04N 1/00509* (2013.01); *H04N 2201/0094* (2013.01)

(58) Field of Classification Search
CPC .......... H04N 1/00498; H04N 1/00506; H04N 1/00509; H04N 1/00384; H04N 1/00413; H04N 2201/0094

USPC ....................................................... 358/1.15
See application file for complete search history.

(56) References Cited

U.S. PATENT DOCUMENTS

| | | | |
|---|---|---|---|
| 2015/0109631 A1* | 4/2015 | Hayano | H04N 1/00307 358/1.13 |
| 2015/0249757 A1* | 9/2015 | Han | H04N 1/00307 358/1.15 |
| 2015/0264220 A1* | 9/2015 | Tsukada | H04N 1/00498 358/1.13 |

FOREIGN PATENT DOCUMENTS

JP    2015-217653 A    12/2015

* cited by examiner

*Primary Examiner* — Saeid Ebrahimi Dehkordy
(74) *Attorney, Agent, or Firm* — Oliff PLC

(57) ABSTRACT

An image forming system includes: an image forming apparatus that stores linguistic information; and a terminal apparatus that is connected to the image forming apparatus via a communication unit and that transmits a control command to the image forming apparatus. The image forming apparatus transmits the linguistic information to the terminal apparatus, and the terminal apparatus displays the screen for controlling the image forming apparatus, using the linguistic information received from the image forming apparatus.

10 Claims, 9 Drawing Sheets

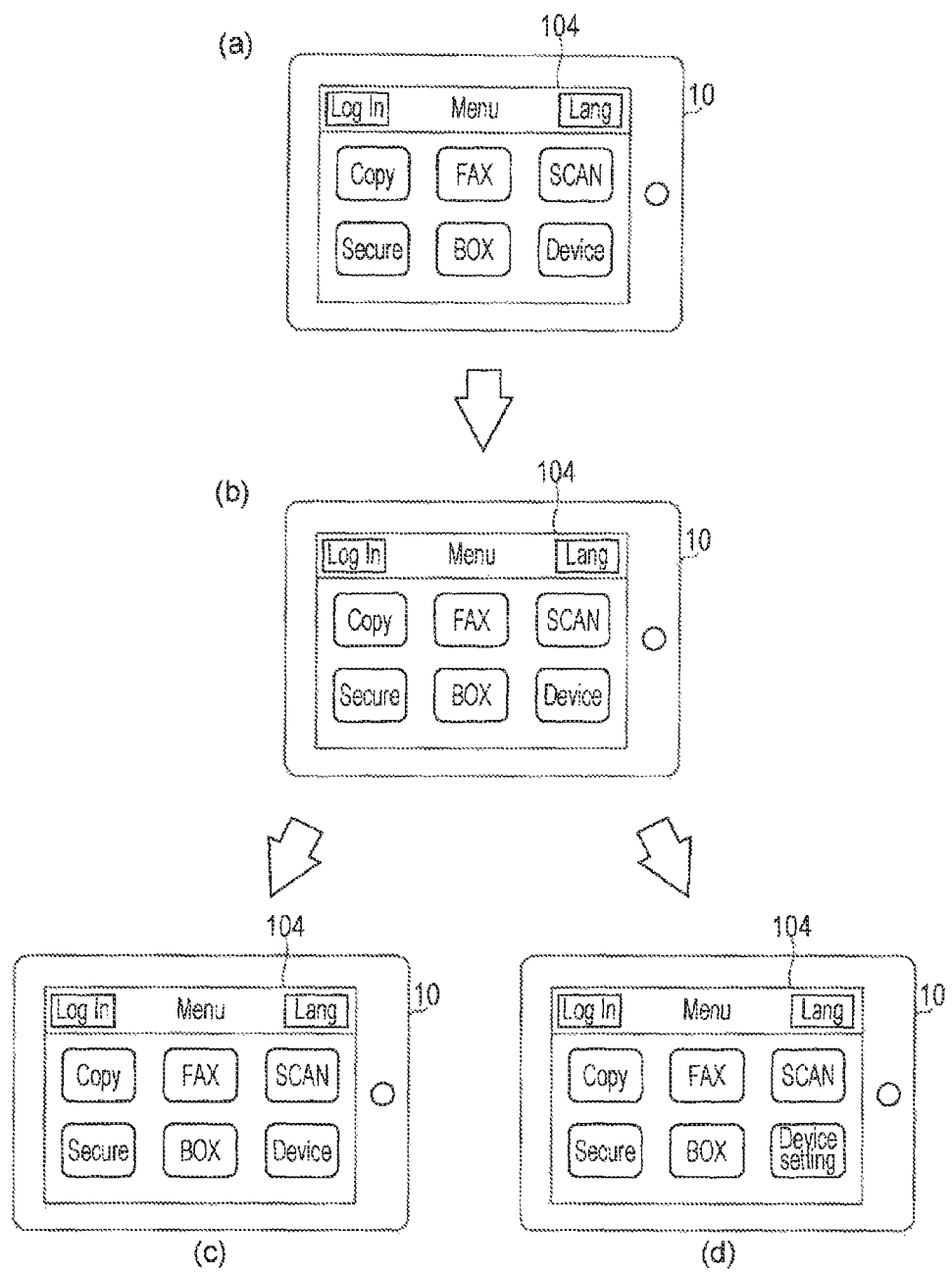

IMAGE FORMING SYSTEM, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2016-187433 filed on Sep. 26, 2016.

BACKGROUND

Technical Field

The present invention relates to an image forming system, a non-transitory computer readable medium, and an image forming method.

SUMMARY

A first aspect of the invention provides an image forming system including: an image forming apparatus that stores linguistic information; and a terminal apparatus that is connected to the image forming apparatus via a communication unit and that transmits a control command to the image forming apparatus. The image forming apparatus transmits the linguistic information to the terminal apparatus, and the terminal apparatus displays a screen that controls the image forming apparatus, using the linguistic information received from the image forming apparatus.

BRIEF DESCRIPTION OF THE DRAWINGS

Exemplary embodiments of the present invention will be described in detail based on the following figures, wherein:

FIG. 9 is a screen explanatory diagram of still another modification.

DETAILED DESCRIPTION

Hereinafter, an exemplary embodiment will be described based on the drawings.

<System Configuration>

Figure 1:
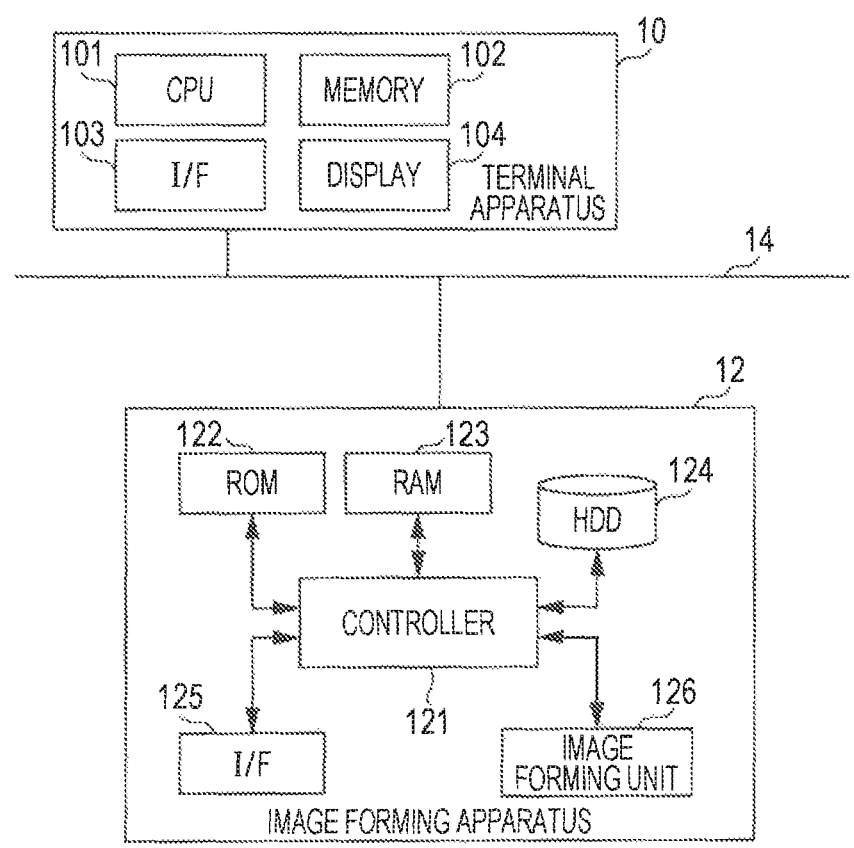
FIG. 1 is an entire configuration diagram of an image forming apparatus in an exemplary embodiment.

FIG. 1 is a configuration block diagram of an image forming system including an image forming apparatus in this exemplary embodiment. The image forming system includes a terminal apparatus 10 and an image forming apparatus 12. The terminal apparatus 10 and the image forming apparatus 12 are connected via a communication unit 14. As the communication unit 14, a data communication network is used, such as a local area network (LAN), Wi-Fi (registered trademark), Bluetooth (registered trademark).

The terminal apparatus 10 is a tablet terminal, a smart phone or the like, and includes one or multiple CPUs 101, a memory 102 such as a ROM, RAM, or SSD, an I/O interface I/F103, and a display 104. The CPUs 101 perform various processing in accordance with a processing program stored in a program memory. On the display 104, the CPUs 101 display various pieces of information including icons (buttons) of applications executable on the image forming apparatus 12. In addition, the CPUs 101 are connected to the image forming apparatus 12 via the I/F 103 and the communication unit 14, and in accordance with an instruction of a user, the CPUs 101 transmit one of execution commands for various jobs to the image forming apparatus 12 according to the operational instruction.

Meanwhile, the image forming apparatus 12 includes a ROM 122, a RAM 123, a HDD 124, a controller 121 configured by one or multiple CPUs, an I/O interface I/F125, and an image forming unit 126.

The controller 121 configured by one or multiple CPUs receives a print job command or the like from the terminal apparatus 10 via the I/O interface I/F125 in accordance with a processing program stored in the ROM 122, interprets PDL data to generate intermediate data, and further generate drawing data (raster data) from the generated intermediate data. Also, the controller 121 executes various jobs such as copy, scan, fax received from the terminal apparatus 10.

The ROM 122 or HDD 124 stores linguistic information processable by the image forming apparatus 12. Specifically, the linguistic information includes a default language, a default keyboard type, supported languages, and supported keyboard types. The support languages and the support keyboard types refer to languages, keyboard types which are other than the default language, the default type and are processable by the image forming apparatus 12.

The image forming unit 126 includes a print module, a scanner module, a fax module, a paper feed module, a document feed module, and an image processing accelerator.

The print module is a module that has a function of outputting an image to a sheet of paper. For instance, the print module has a configuration of a publicly known inkjet type, and prints drawing data on a sheet of paper. Liquid or fusible solid ink is discharged through a nozzle, and recording is made on a sheet of paper, a film or the like. Methods of discharging ink include the drop on demand method (pressure pulse method) in which ink is discharged utilizing an electrostatic attraction force, and thermal inkjet method in which ink is discharged utilizing a pressure generated by forming and growing air bubbles by high heat. A recording head includes, for instance, a head for discharging cyan ink, a head for discharging magenta ink, a head for discharging yellow ink and a head for discharging black ink, and for each of the heads, a line head is used, that has a width at least equivalent to the width of the sheet of paper. Ink droplets of each color are discharged to an intermediate transfer body to be recorded by the recording head, and subsequently, are transferred and printed on a sheet of paper.

The scanner module is a module that reads an image from a paper sheet and converts the image into electronic data.

The fax module is a module that includes a modem or an image processing module for a fax, and performs the fax function.

The paper feed module is a module that feeds a sheet of paper from a paper tray to the print module.

The document feed module is a module that feeds a sheet of paper from a document tray to the scanner module.

The image processing accelerator is a module that performs compression/expansion processing in cooperation with the scanner module. The image processing accelerator is not required, and may be an additional module.

It is to be noted that in addition to these modules, the image forming apparatus 12 may include a finisher that punches holes in or sorts sheets of paper, an authenticator that includes a USB, an IC card reader, and the like and authenticates a user, a monetary charger, a human sensing sensor or a face camera.

Also, the image forming apparatus 12 may be connected to the Internet via the communication unit 14, and may be configured to allow transmission and reception of data to and from a server or a database (DB) on the Internet.

In an image forming apparatus 12 in related art, an operation panel to be operated by a user is integrally incorporated in the image forming apparatus 12, and the controller 121 executes various jobs according to an operational instruction signal from the operation panel. In this exemplary embodiment, however, the image forming apparatus 12 is not provided with an operation panel and the function of an operation panel is provided in the terminal apparatus 10. Specifically, an application installed in the terminal apparatus 10 provides the functions of the operation panel, and controls the functions of the image forming apparatus 12. In this sense, the terminal apparatus 10 in this exemplary embodiment may be regarded as the operation panel of a multifunction machine, and the image forming apparatus 12 may be regarded as the main body (excluding the operation panel) of the multifunction machine.

The application of the terminal apparatus 10 provides at least the following functions:

Language setting function
Login function
Job selection/execution command function The language setting function in these functions includes setting of a display language and a keyboard type. The display language is the language displayed on a screen, and the keyboard type is the layout of a keyboard. Although in the image forming apparatus 12 in related art, the display language and keyboard type of the operation panel are matched with the language in the image forming apparatus 12, in a system configuration in which the terminal apparatus 10 and the image forming apparatus 12 are separately provided and both are connected via the communication unit 14 as in this exemplary embodiment, the language and keyboard type of the terminal apparatus 10 and the language and keyboard type of the image forming apparatus 12 have to be matched.

For instance, even when a specific language desired by a user is supported and can be displayed by the terminal apparatus 10, if the specific language is not supported by the image forming apparatus 12, the image forming apparatus 12 cannot be operated and a desired job cannot be performed.

Thus, in this exemplary embodiment, communication is performed between the terminal apparatus 10 and the image forming apparatus 12, and the language and keyboard type suitable for job execution are set in the terminal apparatus 10.

Hereinafter, the setting of a language and a keyboard type in the terminal apparatus 10 will be described in detail. It is to be noted that an application necessary for controlling the image forming apparatus 12 is assumed to be pre-installed in the terminal apparatus 10. The application may be bundled with the image forming apparatus 12 or may be downloaded and installed from a specific server. Also, communication between the terminal apparatus 10 and the image forming apparatus 12 is assumed to be established.

<Start-Up Sequence>

Figure 2:
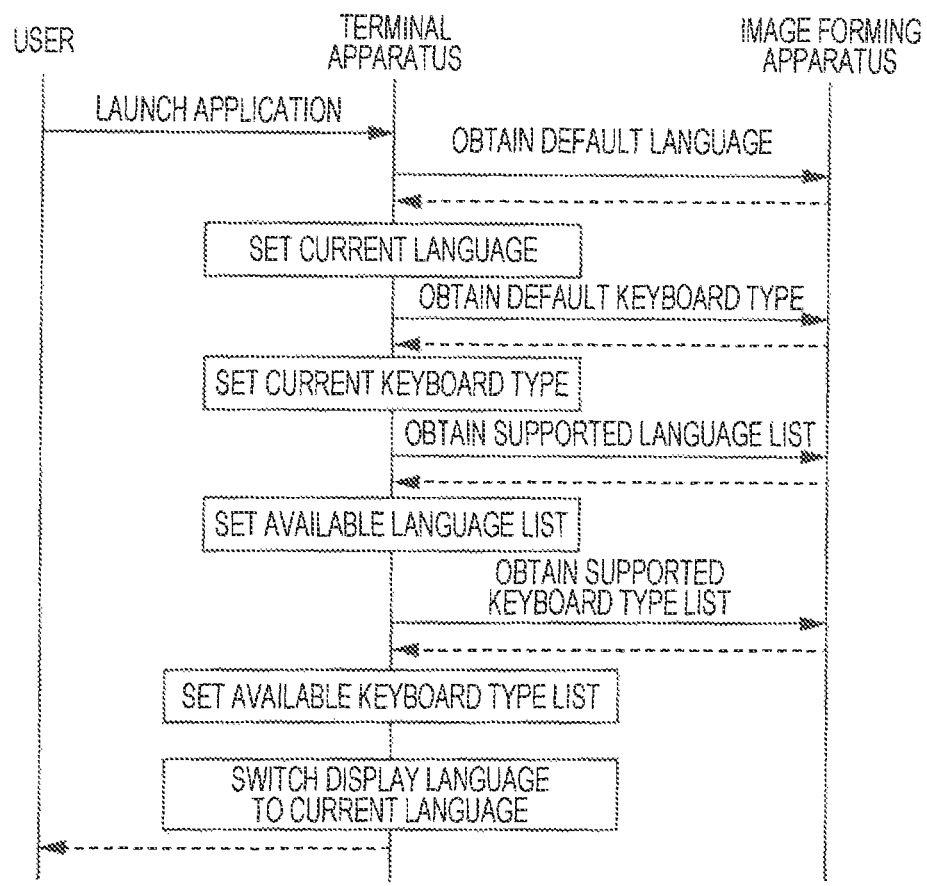
FIG. 2 is a start-up sequence diagram in the exemplary embodiment.

FIG. 2 illustrates the start-up sequence for an application (application that operates and controls the image forming apparatus 12) installed in the terminal apparatus 10.

A user inputs a start-up instruction for the application by touching the icon (button) of the application displayed on the display 104 of the terminal apparatus 10.

In response to the operational instruction, the CPU 101 of the terminal apparatus 10 transmits a default language acquisition request to the image forming apparatus 12 via I/F 103 and the communication unit 14.

In response to the request, the controller 121 of the image forming apparatus 12 reads default language data pre-stored in the ROM 122 or HDD 124, and transmits the data back to the terminal apparatus 10.

The CPU 101 of the terminal apparatus 10 receives the default language data from the image forming apparatus 12, and sets the current language of the terminal apparatus 10 to the default language.

Subsequently, the CPU 101 of the terminal apparatus 10 transmits a default keyboard type acquisition request to the image forming apparatus 12.

In response to the request, the controller 121 of the image forming apparatus 12 reads default keyboard type data pre-stored in the ROM 122 or HDD 124, and transmits the data back to the terminal apparatus 10.

The CPU 101 of the terminal apparatus 10 receives the default keyboard type data from the image forming apparatus 12, and sets the current keyboard type of the terminal apparatus 10 to the default keyboard type.

Subsequently, the CPU 101 of the terminal apparatus 10 transmits a support language list acquisition request to the image forming apparatus 12.

In response to the request, the controller 121 of the image forming apparatus 12 reads a support language list data pre-stored in the ROM 122 or HDD 124, and transmits the data back to the terminal apparatus 10.

The CPU 101 of the terminal apparatus 10 receives the support language list data from the image forming apparatus 12, and sets available language list to the support language list data.

The CPU 101 of the terminal apparatus 10 further transmits a support keyboard type list acquisition request to the image forming apparatus 12.

In response to the request, the controller 121 of the image forming apparatus 12 reads support keyboard type list data pre-stored in the ROM 122 or HDD 124, and transmits the data back to the terminal apparatus 10.

The CPU 101 of the terminal apparatus 10 receives the support keyboard type list data from the image forming apparatus 12, and sets available keyboard type list to the support keyboard type list data.

As described above, based on the data from the image forming apparatus 12, the CPU 101 of the terminal apparatus 10 makes the following settings:

Current language setting
Current keyboard type setting
Available language list setting
Available keyboard type list setting Later, the CPU 101 switches the display language of the terminal apparatus 10 to the set current language, and displays the language on the display 104.

For instance, when the default state is as follows:
the display language of the terminal apparatus 10 is Japanese,
the default keyboard type of the terminal apparatus 10 is Japanese (kana),
the default language of the image forming apparatus 12 is English, and
the default keyboard type of the image forming apparatus 12 is English,
the display language of the application of the terminal apparatus 10 is switched from Japanese to English, and the keyboard type is also switched from Japanese (kana) to English. A native English user can control the image forming apparatus 11 by operating the terminal apparatus 10 without a strange feeling.

Meanwhile, when the default language and/or the default keyboard type are changed, a user instructs the change using the started application of the terminal apparatus 10.

<Sequence for Changing Default Language and Keyboard Type>

Figure 3A:
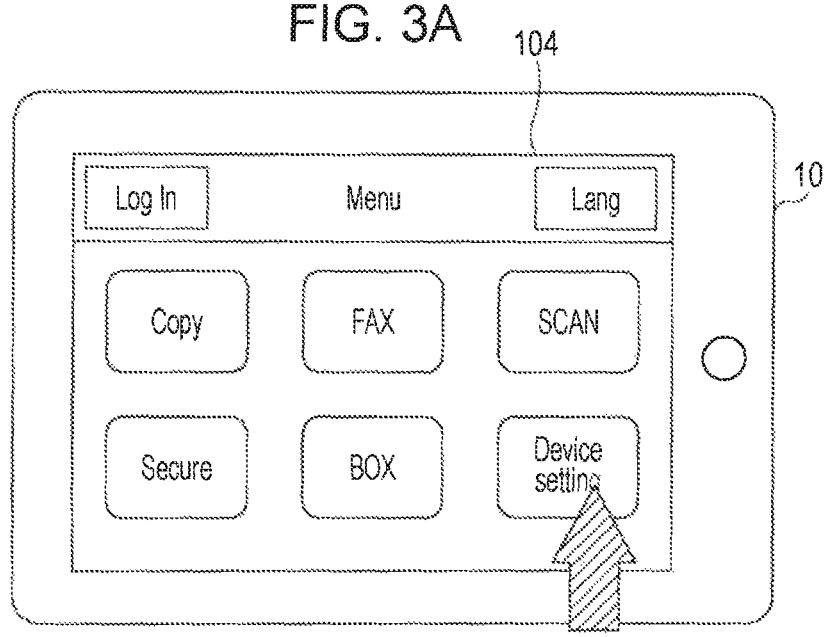
FIGS. 3A and 3B are each an explanatory diagram of a screen for changing a default language and a default keyboard type in the exemplary embodiment.
Figure 3B:
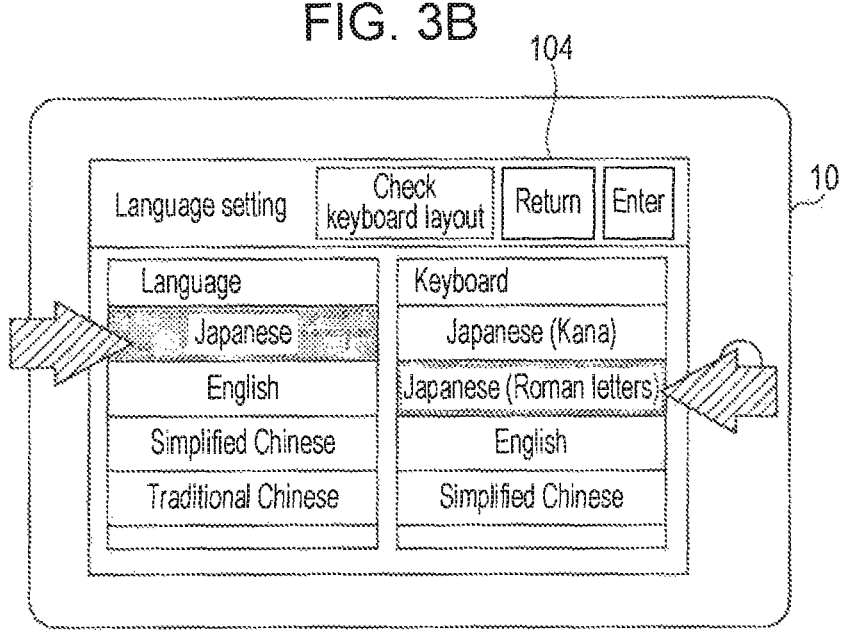

FIGS. 3A and 3B illustrate screen transition displayed on the display 104 of the terminal apparatus 10 when at least one of the default language and the default keyboard type is changed.

FIG. 3A illustrates the home screen after start-up of the application. The home application in the application generates and displays a home screen. There are displayed icons (buttons) for various applications corresponding to jobs executable by the image forming apparatus 12, that is, for applications of "copy", "fax", "scan", "secure", "box", and "device setting". The buttons correspond to respective applications. When "copy" button is touched, copy application starts up and transmits an execution command for a copy job to the image forming apparatus 12 to execute the copy job. When "fax" button is touched, fax application starts up and transmits an execution command for a fax job to the image forming apparatus 12 to execute the fax job.

In the start-up sequence, the default language and the default keyboard type are set in the terminal apparatus 10, and FIG. 3A illustrates the case where the default language is set to Japanese. When a user changes at least one of the default language and the default keyboard type, the user touches and selects "device setting" button on the home screen. In response to the operational instruction, the CPU 101 of the terminal apparatus 10 starts up device setting application, and obtains necessary linguistic information from the image forming apparatus 12 to display a screen for changing default language and keyboard type on the display 104.

FIG. 3B illustrates an example of a screen for changing default language and keyboard type. On the left side of the screen, a list of languages available in the image forming apparatus 12 is displayed as "Language". On the right side of the screen, a list of keyboards available in the image forming apparatus 12 is displayed as "Keyboard". Needless to say, the available language list may be displayed on the upper side of the screen, and the available keyboard list may be displayed on the lower side of the screen.

When changing the default language and/or the default keyboard type, a user selects a desired default language and/or a desired keyboard type from the list. FIG. 3B illustrates that Japanese as the default language and Japanese (Roman letters) as the default keyboard type are selected.

Figure 4:
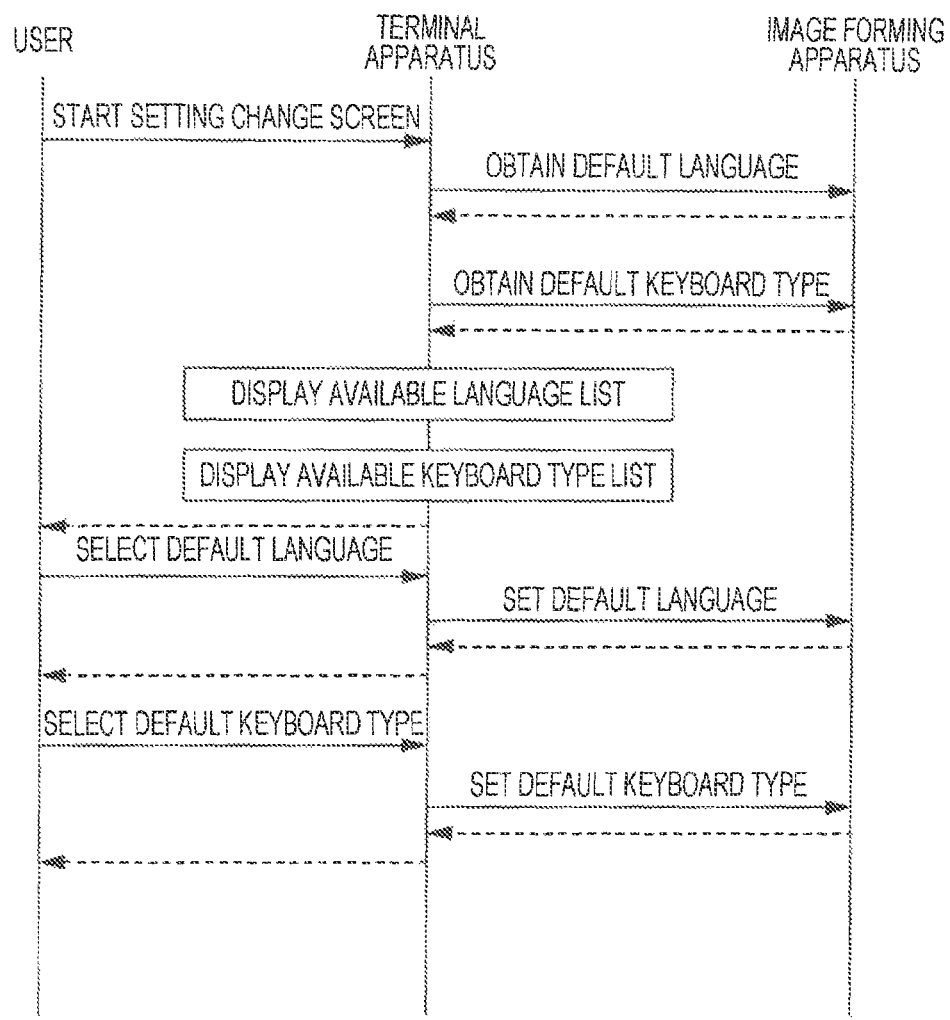
FIG. 4 is a sequence diagram for changing the default language and the default keyboard type in the exemplary embodiment.

FIG. 4 illustrates a sequence of changing default language/default keyboard type.

A user operates the terminal apparatus 10 and instructs to start a setting change screen. Specifically, as illustrated in FIG. 3A, a user instructs to start the setting change screen by touching the "device setting" button. In response to the instruction, the CPU 101 of the terminal apparatus 10 starts up device setting application, and transmits a default language acquisition request to the image forming apparatus 12.

In response to the request, the controller 121 of the image forming apparatus 12 reads default language data pre-stored in the ROM 122 or HDD 124, and transmits the data back to the terminal apparatus 10.

In addition, the CPU 101 of the terminal apparatus 10 transmits a default keyboard type acquisition request to the image forming apparatus 12.

In response to the request, the controller 121 of the image forming apparatus 12 reads default keyboard type data pre-stored in the ROM 122 or HDD 124, and transmits the data back to the terminal apparatus 10.

Upon receiving the default language data and default keyboard type data from the image forming apparatus 12, the CPU 101 of the terminal apparatus 10 displays a default language list and a default keyboard type list on the display 104 (see FIG. 3B).

A user visually recognizes the list displayed on the display 104, and selectively designates a desired default language. The CPU 101 of the terminal apparatus 10 sets the default language for the terminal apparatus 10, and transmits the default language setting to the image forming apparatus 12 according to the designation. The controller 121 of the image forming apparatus 12 sets a default language of its own according to the setting command.

Also, the user visually recognizes the list displayed on the display 104, and selectively designates a desired keyboard type. The CPU 101 of the terminal apparatus 10 sets the default keyboard type for the terminal apparatus 10, transmits the default keyboard type to the image forming apparatus 12 according to the designation. The controller 121 of the image forming apparatus 12 sets a default keyboard type of its own according to the setting command.

As described above, the default language and the default keyboard type for the terminal apparatus 10 and the default language and the default keyboard type for the image forming apparatus 12 are each changed. The default languages and the default keyboard types for the terminal apparatus 10 and the image forming apparatus 12 after the change are the same.

Subsequently, a case will be described where a user sets a current language and a current keyboard type. The current language and the current keyboard type are a language and a keyboard type that are temporarily used, and is switched, for instance, for each of users who use the terminal apparatus 10.

<Sequence for Changing Current Language and Current Keyboard Type>

Figure 5:
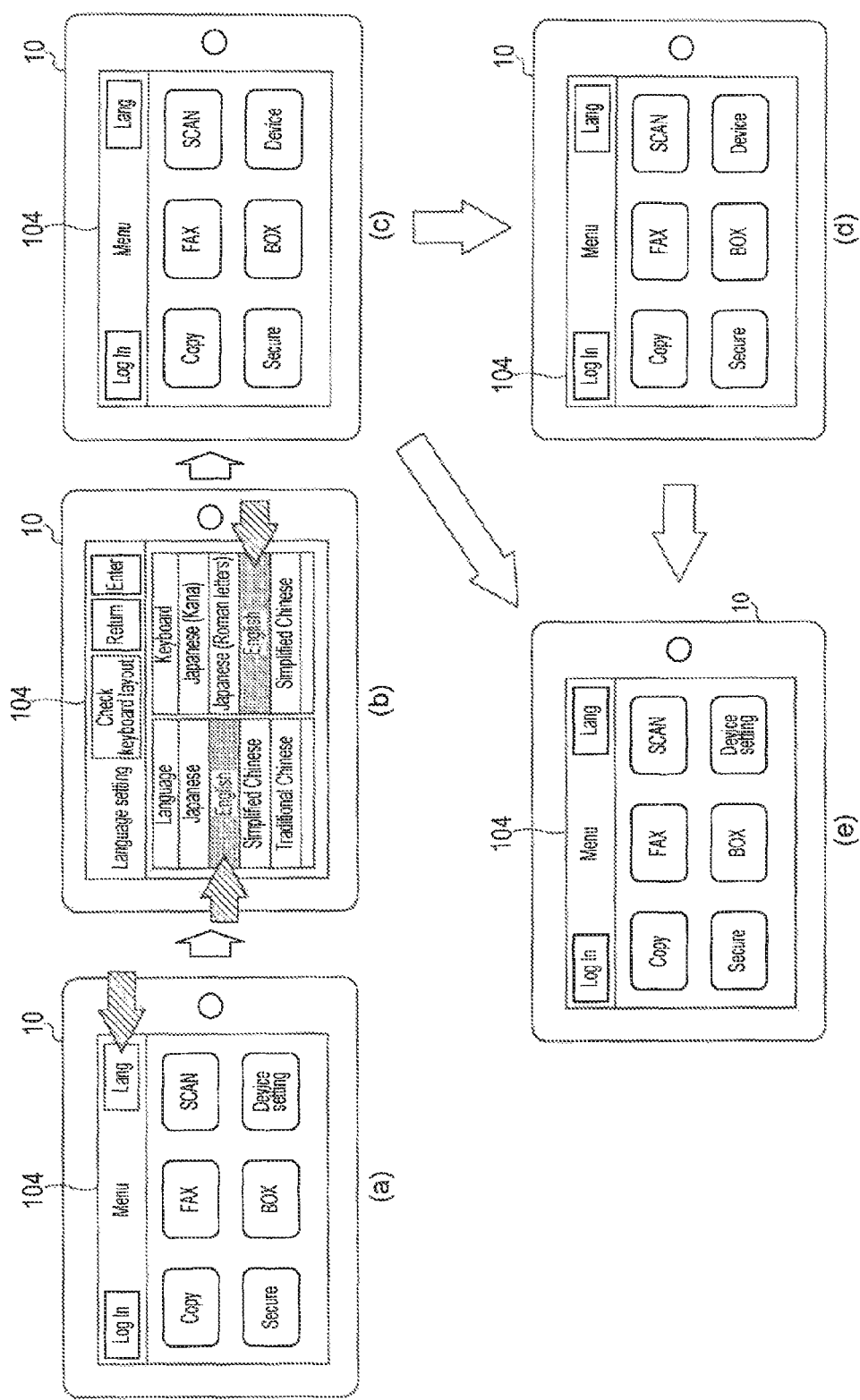
FIG. 5 is an explanatory diagram of a screen for changing a current language and a current keyboard type in the exemplary embodiment.

FIG. 5 illustrates screen transition of the terminal apparatus 10 when a current language and/or a current keyboard type are changed.

(a) of FIG. 5 is a home screen generated and displayed by the home application, and a user instructs to change the current language by touching the "language" button in the home screen displayed on the display 104. In response to the instruction, the CPU 101 of the terminal apparatus 10 displays a language change screen on the display 104.

(b) of FIG. 5 illustrates an example of a language change screen. On the left side of the screen, an available language list is displayed, and on the right side of the screen, an available keyboard type list is displayed. A user selects desired language and keyboard from the language and keyboard type lists. In (b) of FIG. 5, the user selects English as the language, and selects English as the keyboard type. In response to the operational instruction, the CPU 101 of the terminal apparatus 10 switches the display language of the terminal apparatus 10 from Japanese to English, and switches the keyboard type to English.

(c) of FIG. 5 illustrates a screen example when the current language is switched to English. All items on the home screen are displayed in English. Although not illustrated in (c) of FIG. 5, the keyboard is also displayed in English layout.

A user operates the Copy button or other button on the screen of (c) of FIG. 5 to transmit an execution command for a job to the image forming apparatus 12. However, when a certain time period elapses without any operation being performed, the CPU 101 of the terminal apparatus 10 detects no operation for the certain time period, and returns the current language to the default language.

(e) of FIG. 5 illustrates an example of a screen that is returned automatically after elapse of a certain time period. When the default language is Japanese, the default keyboard type is Japanese (Roman letters), the current language is English, and the current keyboard type is English, after elapse of a certain time period, the screen is automatically returned to the default language of Japanese and the default keyboard type of Japanese.

Also, similarly to when a certain time period elapses, when a user logs out from the screen of (c) of FIG. 5, the CPU 101 of the terminal apparatus 10 returns the current language to the default language. In short, in the current language setting, in either when a certain time period elapses in no operation state or when a user logs out, the terminal apparatus 10 is returned to the default language and the default keyboard type. This is because the current language is strictly a temporary language, thus when no operation continues for a certain time period, it is desirable to return the current language to the default language which is a standard language, and also operational convenience for a subsequent user is taken into consideration. The certain time period is not necessarily fixed and may be adjustable.

Meanwhile, when a system administrator logs in the screen of (c) of FIG. 5, the current language and the current keyboard type are maintained as it is and displayed.

(d) of FIG. 5 illustrates a screen example when an administrator logs in. The screen example is essentially the same as the screen of (c) of FIG. 5. When an administrator logs out, the CPU 101 of the terminal apparatus 10 returns the current language setting to the default language. That is, screen transition to the screen of (e) of FIG. 5 is made.

Figure 6:
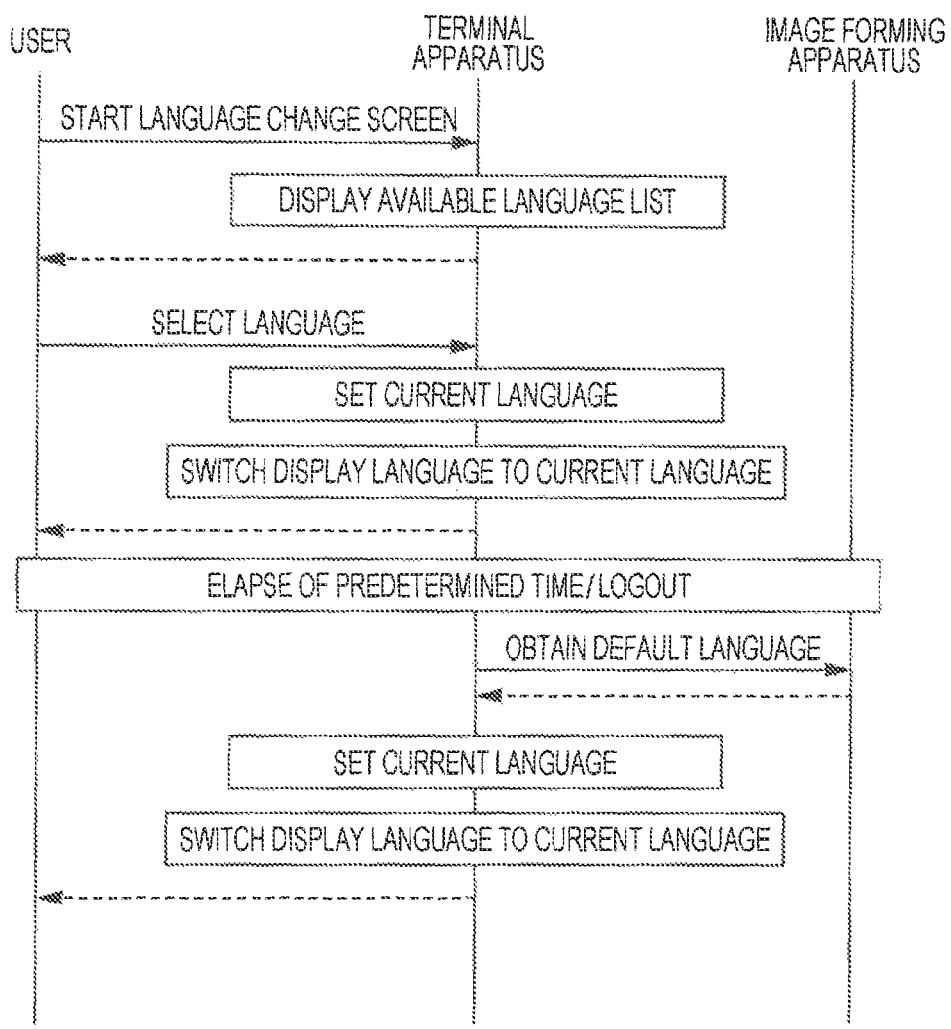
FIG. 6 is a sequence diagram for changing the current language and the current keyboard type in the exemplary embodiment.

FIG. 6 illustrates a sequence of changing the current language/current keyboard type.

A user operates the terminal apparatus 10 to start up the language change screen. In response to the operation, the CPU 101 of the terminal apparatus 10 displays the language change screen on the display 104. Specifically, in response to touching on the "language" button in the home screen, the CPU 101 displays the available language list and the available keyboard type list illustrated in (b) of FIG. 5. The CPU 101 of the terminal apparatus 10 holds the support language and the support keyboard type in the memory 102, which have been obtained from the image forming apparatus 12 in the start-up sequence, and reads the support language and support keyboard type to display the available language list and the available keyboard type list.

When a user selects a desired language and a desired keyboard type from the list displayed on the display 104, in response to the operation, the CPU 101 of the terminal apparatus 10 sets and switches the current language and the current keyboard type. Each of the selected language and keyboard type is included in the support languages and support keyboard types pre-stored in the image forming apparatus 12, and thus the image forming apparatus 12 can cope with the selected language and keyboard type.

After a user switches the current language to the selected desired language and keyboard type, when a certain time period has elapsed without any operation being performed or when a user has logged out, the CPU 101 of the terminal apparatus 10 detects this event and transmits a default language acquisition request to the image forming apparatus 12. Needless to say, when a certain time period has elapsed with an operation performed or when a user has not logged out, the current language is maintained as it is.

In response to the request, the controller 121 of the image forming apparatus 12 transmits the default language back to the terminal apparatus 10. The CPU 101 of the terminal apparatus 10 receives the default language from the image forming apparatus 12, sets a new current language to the default language and switches the display language. Thus, the display language is returned to the default language.

When the current language and the default language are matched, even after elapse of a certain time period or after log out, no change occurs in the display. For instance, when the current language is Japanese and the default language is also Japanese, after the elapse of a certain time period without any operation being performed, the CPU 101 of the terminal apparatus 10 sends a default language acquisition request to the image forming apparatus 12, and receives Japanese as the default language from the image forming apparatus 12. However, after comparison between the current language and the received default language, both are matched, thus the current language is maintained as it is. The default language may be stored in the memory 102 of the terminal apparatus 10, and the stored default language is read then the current language may be returned to the default language.

As described above, in this exemplary embodiment, even when the terminal apparatus 10 and the image forming apparatus 12 are physically separated and the operation panel function of the image forming apparatus 12 is provided in the terminal apparatus 10, the default language and the default keyboard type in the terminal apparatus 10 can be matched with the default language and the default keyboard type in the image forming apparatus 12, and it is possible to change the current language and the current keyboard type of the terminal apparatus 10 in a range of language and keyboard type which are available in the image forming apparatus 12, and thus convenience of a user is improved.

Although the exemplary embodiment of the present invention has been described so far, the present invention is not limited to this, and various modifications may be made. Hereinafter, modifications will be described.

First Modification

Although the exemplary embodiment has a configuration in which linguistic information on default language, default keyboard type, support language, support keyboard type is pre-stored in the image forming apparatus 12, the exemplary embodiment may have a configuration in which the linguistic information is not stored in the image forming apparatus 12, but is stored in the memory 102 of the terminal apparatus 10. In this case, the default language and others are transmitted from the terminal apparatus 10 to the image forming apparatus 12, and are stored therein.

Figure 7:
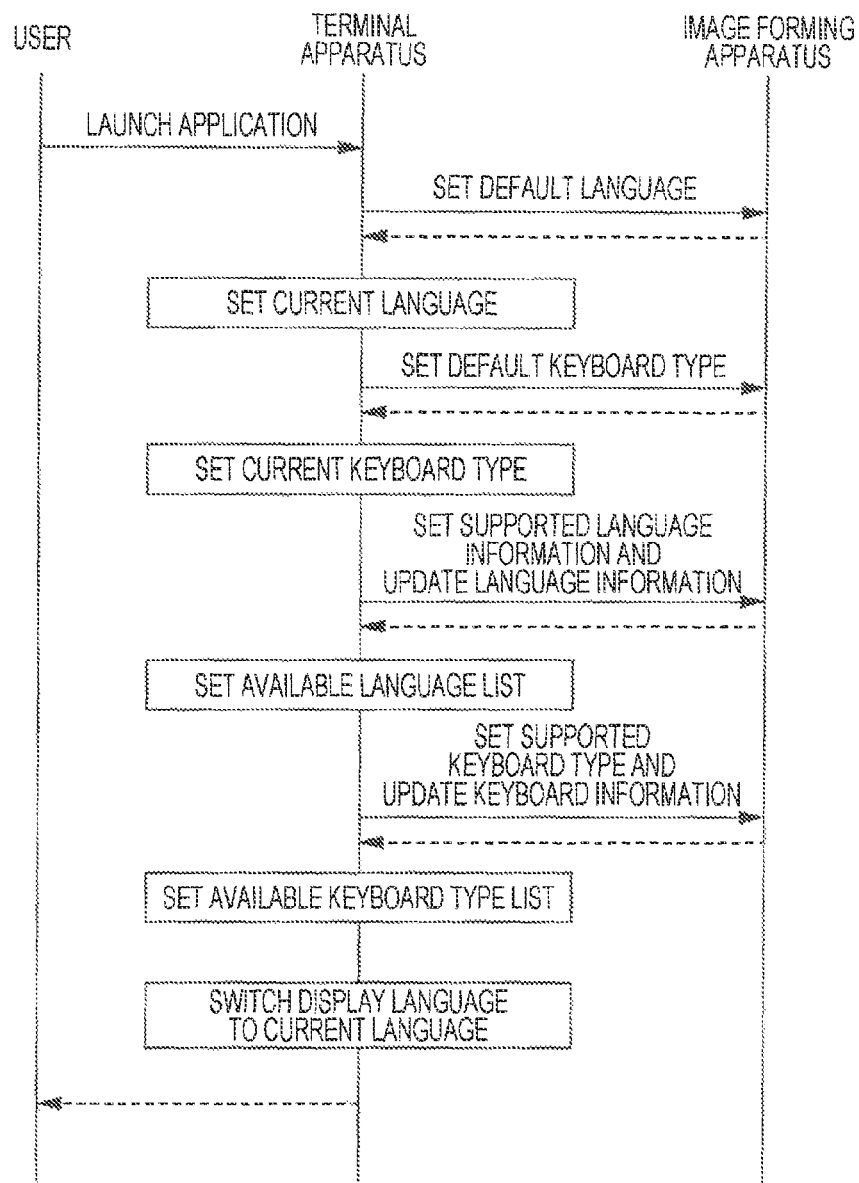
FIG. 7 is a sequence diagram of a first modification.

FIG. 7 illustrates a start-up sequence in a first modification.

A user inputs a start-up instruction for an application by touching the icon (button) of the application displayed on the display 104 of the terminal apparatus 10.

In response to the operational instruction, the CPU 101 of the terminal apparatus 10 reads default language data pre-stored in the memory 102, and transmits the read default language data to the image forming apparatus 12.

The controller 121 of the image forming apparatus 12 receives the default language data from the terminal apparatus 10, and stores the data in the RAM 123 as the default language. When storing the default language is completed, the controller 121 of the image forming apparatus 12 transmits a completion notification back to the terminal apparatus 10.

Upon receiving the completion notification from the image forming apparatus 12, the CPU 101 of the terminal apparatus 10 sets the current language to the default language read from the memory 102.

Subsequently, the CPU 101 of the terminal apparatus 10 reads default keyboard type data pre-stored in the memory 102, and transmits the read default keyboard type data to the image forming apparatus 12.

The controller 121 of the image forming apparatus 12 receives the default keyboard type data from the terminal apparatus 10, and stores the data in the RAM 123 as the default keyboard type. When storing the default keyboard type is completed, the controller 121 of the image forming apparatus 12 transmits a completion notification back to the terminal apparatus 10.

Upon receiving the completion notification from the image forming apparatus 12, the CPU 101 of the terminal apparatus 10 sets the current keyboard type to the default keyboard type read from the memory 102.

Subsequently, the CPU 101 of the terminal apparatus 10 reads support linguistic information pre-stored in the memory 102, and transmits the read support linguistic information to the image forming apparatus 12.

The controller 121 of the image forming apparatus 12 receives the support linguistic information from the terminal apparatus 10, and stores the information in the RAM 123 as the support linguistic information. It is to be noted that when support linguistic information is already stored in the RAM 123, the RAM 123 is updated with newly received support linguistic information. Needless to say, when the RAM 123 has an extra capacity, the newly received support linguistic information may be stored in another area without overwriting the stored information. When storing the support linguistic information is completed, the controller 121 of the image forming apparatus 12 transmits a completion notification back to the terminal apparatus 10.

Upon receiving the completion notification from the image forming apparatus 12, the CPU 101 of the terminal apparatus 10 sets available language list to the support linguistic information read from the memory 102.

Subsequently, the CPU 101 of the terminal apparatus 10 reads support keyboard type information pre-stored in the memory 102, and transmits the read support keyboard type information to the image forming apparatus 12.

The controller 121 of the image forming apparatus 12 receives the support keyboard type information from the terminal apparatus 10, and stores the information in the RAM 123 as the support keyboard type information. When support keyboard type information is already stored in the RAM 123, the RAM 123 is updated with newly received support keyboard type information. When storing the support keyboard type information is completed, the controller 121 of the image forming apparatus 12 transmits a completion notification back to the terminal apparatus 10.

Upon receiving the completion notification from the image forming apparatus 12, the CPU 101 of the terminal apparatus 10 sets available support keyboard type list to the support keyboard type information read from the memory 102.

As described above, after the default language, the default keyboard type, the available language list, the available keyboard type list are stored in the image forming apparatus 12, the CPU 101 of the terminal apparatus 10 switches the display language to the set current language, and displays the current language on the display 104.

Second Modification

Although linguistic information is stored in the image forming apparatus 12 from the terminal apparatus 10 in the first modification, necessary linguistic information may be downloaded from a server or a DB on the Internet and may be stored in the image forming apparatus 12.

Figure 8:
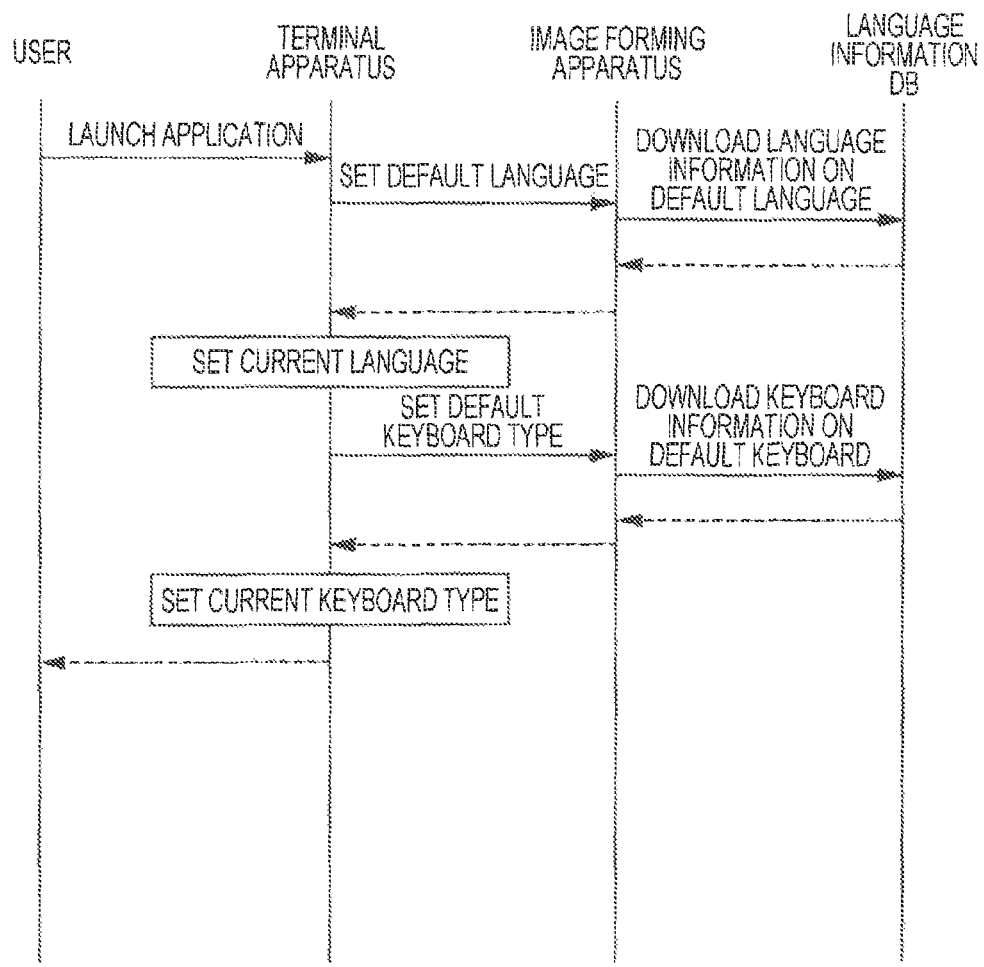
FIG. 8 is a sequence diagram of another modification.

FIG. 8 illustrates a start-up sequence in a second modification.

A user inputs a start-up instruction for an application by touching the icon (button) of the application displayed on the display 104 of the terminal apparatus 10.

In response to the operational instruction, the CPU 101 of the terminal apparatus 10 reads default language data pre-stored in the memory 102, and transmits information identifying the read default language data to the image forming apparatus 12.

The controller 121 of the image forming apparatus 12 receives the identification information from the terminal apparatus 10, accesses a DB storing linguistic information, using the identification information, and downloads the default language data from the DB to store the data in the RAM 123. When storing the default language is completed, the controller 121 of the image forming apparatus 12 transmits a completion notification back to the terminal apparatus 10.

Upon receiving the completion notification from the image forming apparatus 12, the CPU 101 of the terminal apparatus 10 sets the current language to the default language read from the memory 102.

Subsequently, the CPU 101 of the terminal apparatus 10 reads default keyboard type data pre-stored in the memory 102, and transmits information identifying the read default keyboard type data to the image forming apparatus 12.

The controller 121 of the image forming apparatus 12 receives the identification information from the terminal apparatus 10, accesses a DB storing linguistic information, using the identification information, and downloads the default keyboard type data from the DB to store the data in the RAM 123. When storing the default keyboard type is completed, the controller 121 of the image forming apparatus 12 transmits a completion notification back to the terminal apparatus 10.

Upon receiving the completion notification from the image forming apparatus 12, the CPU 101 of the terminal apparatus 10 sets the current keyboard type to the default keyboard type read from the memory 102.

Also in the second modification, similarly to the first modification, even when linguistic information is not pre-stored in the image forming apparatus 12, if necessary, linguistic information can be obtained and stored from the terminal apparatus 10 or a server or a DB on the Internet.

Also, in the second modification, not the default language and default keyboard type, but the support language and support keyboard type may be downloaded from a DB and stored in the RAM 123 of the image forming apparatus 12.

Specifically, when the current language is changed via the terminal apparatus 10, the CPU 101 of the terminal apparatus 10 transmits information identifying the post-change current language to the image forming apparatus 12. The controller 121 of the image forming apparatus 12 determines whether or not the post-change current language is supported, and when not supported, the controller 121 accesses a DB to download and store the current language in the RAM 123. For instance, when the current language is changed to Arabic which is not supported in the image forming apparatus 12, Arabic is downloaded from a DB. In a computer, although a technique of downloading a necessary function as a plug-in from a server on the Internet is publicly known, in this modification, it is to be noted that a necessary function is downloaded via the image forming apparatus 12 in conjunction with the change of the current language in the terminal apparatus 10.

Third Modification

The exemplary embodiment and the first modification may be combined. In this case, the linguistic information pre-stored in the image forming apparatus 12 is supplied to the terminal apparatus 10 and the linguistic information pre-stored in the terminal apparatus 10 is supplied to the image forming apparatus 12.

Fourth Modification

The first modification and the second modification may be combined. In this case, the linguistic information pre-stored in the terminal apparatus 10 is supplied to the image forming apparatus 12 and the linguistic information pre-stored in a DB is supplied to the image forming apparatus 12.

Fifth Modification

In the exemplary embodiment, when a certain time period elapses in no operation state in the current language state, or when a user logs out, the CPU 101 of the terminal apparatus 10 performs control so that the current settings are returned to the default language and the default keyboard type. When a certain time period elapses in no operation state and the current settings are returned to the default language and the default keyboard type, if the same user logs in again and operates the terminal apparatus 10 again, the default language and the default keyboard type may be automatically restored to previous current language and current keyboard type.

FIG. 9 illustrates the screen transition in this case. (a) of FIG. 9 illustrates a screen example when the current language and the current keyboard type are set to English. When a certain time period elapses in this state without any operation being performed, the CPU 101 of the terminal apparatus 10 returns the current language and the current keyboard type to the default language and the default type.

(b) of FIG. 9 illustrates the screen after elapse of a certain time period. When the default language and the default keyboard type are Japanese and Japanese (Roman letters), the display 104 returns to Japanese display. After the current settings are returned to the default language and the default keyboard type, the screen differs according to a user who logs in.

(c) of FIG. 9 is a screen when the same user logs in again. The information on the current language and the current keyboard type before return to the default language and the default keyboard type is stored in the memory 102 in association with the information on the user by the CPU 101 of the terminal apparatus 10, and when the same user logs in again, it is determined using information (a user ID and a password) at the time of login whether or not the same user has logged in again. When the same user logs in again, the previous current language and the current keyboard type stored in the memory 102 are reset and displayed on the display 104. In this case, when the previous current language and the current keyboard type are English, display is in English. Normally, in order to change the current language, as described in the exemplary embodiment, it is necessary to perform an operation of touching the "language" button on the home screen and selecting one from the available language list. However, in this case, logging in only allows the current language to be changed automatically.

Meanwhile, when a different user logs in, as illustrated in (d) of FIG. 9, the CPU 101 of the terminal apparatus 10 maintains the default language and the default keyboard type as it is without returning to the previous current language and current keyboard type.

According to this modification, even when the same user logs in again, the user may perform a desired job by quickly operating the terminal apparatus 10 in a desired language.

Sixth Modification

In the exemplary embodiment, the image forming apparatus 12 is not provided with an operation section or an operation panel, whose function is provided in the terminal apparatus 10. However, this does not necessarily mean that the image forming apparatus 12 is not provided with an operation section or an operation panel at all times, and the image forming apparatus 12 may be provided with a display that displays a progress status of a job, or an operation section for performing an auxiliary operation. The terminal apparatus 10 and the operation panel of the image forming apparatus 12 may constitute a redundant system.

Seventh Modification

In the exemplary embodiment, a user changes the current language in the terminal apparatus 10 by touching the "language" button on the home screen. However, voice of a user may be picked up by a microphone provided in the terminal apparatus 10, the language (such as Japanese, English, or Chinese) of the voice may be identified, and the current language and the current keyboard type may be changed so as to match with the identified language.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
an image forming apparatus that stores linguistic information including a default language and one or more support languages; and
a terminal apparatus that is connected to the image forming apparatus via a communication unit and that transmits a control command to the image forming apparatus, wherein
the control command includes a request for the linguistic information,
the image forming apparatus transmits the linguistic information to the terminal apparatus, the linguistic information including a default language,
the terminal apparatus sets a current language as the default language,
the terminal apparatus displays a screen for controlling the image forming apparatus, using the default language,
the terminal apparatus sets the current language to one of the one or more support languages when selected by a user and displays the screen for controlling the image forming apparatus, and
when no operation by the user continues for a certain time period or the user logs out of the terminal apparatus, the terminal apparatus requests the default language from the image forming apparatus, the image forming apparatus transmits the default language to the terminal apparatus and the terminal apparatus returns the current language to the default language and displays the screen for controlling the image forming apparatus.

2. The image forming system according to claim 1,
wherein the linguistic information further includes a default keyboard type and a support keyboard type.

3. The image forming system according to claim 1,
wherein when the same user operates the screen again after the terminal apparatus returns the current language to the default language and displays the screen for controlling the image forming apparatus, the terminal apparatus again returns the default language to the current language and displays the screen for controlling the image forming apparatus.

4. An image forming system comprising:
an image forming apparatus; and
a terminal apparatus that stores linguistic information, including a default language and one or more support languages, and is connected to the image forming apparatus via a communication unit, and that transmits a control command to the image forming apparatus, wherein
the terminal apparatus sets a current language as the default language,
the terminal apparatus transmits the linguistic information to the image forming apparatus including the default language and displays a screen for controlling the image forming apparatus using the default language,
the terminal apparatus sets the current language to one of the one or more support languages when selected by a user, transmits the one or more support languages selected by the user to the image forming apparatus and displays the screen for controlling the image forming apparatus, and
when no operation by the user continues for a certain time period or the user logs out of the terminal apparatus, the terminal apparatus returns the current language to the default language and displays the screen for controlling the image forming apparatus.

5. The image forming system according to claim 4,
wherein the terminal apparatus downloads the linguistic information from an external database.

6. The image forming system according to claim 4,
wherein the linguistic information further includes a default keyboard type and a support keyboard type.

7. The image forming system according to claim 4,
wherein when the same user operates the screen again after the terminal apparatus returns the current language to the default language and displays the screen for controlling the image forming apparatus, the terminal apparatus again returns the default language to the current language and displays the screen for controlling the image forming apparatus.

8. A non-transitory computer readable medium storing a program for an image forming system including a terminal apparatus and an image forming apparatus, the program causing a processor of the terminal apparatus to execute a process comprising:
transmitting an acquisition request for linguistic information to the image forming apparatus;
receiving the linguistic information transmitted back from the image forming apparatus the linguistic information including a default language and one or more support languages;
displaying a screen for controlling the image forming apparatus using the default language;
setting the current language to one of the one or more support languages when selected by a user;
displaying the screen for controlling the image forming apparatus using the selected one or more support languages; and
when no operation by the user continues for a certain time period or the user logs out of the terminal apparatus:
requesting the default language from the image forming apparatus,
receiving the default language from the image forming apparatus, and
displaying the screen for controlling the image forming apparatus using the default language.

9. An image forming method comprising:
storing linguistic information by an image forming apparatus, the linguistic information including a default language and one or more support languages;
connecting to the image forming apparatus via a communication unit and transmitting a control command to the image forming apparatus from a terminal apparatus, the control command includes a request for the linguistic information;
transmitting the linguistic information to the terminal apparatus from the image forming apparatus, the linguistic information including the default language;
displaying a screen for controlling the image forming apparatus at the terminal apparatus using the default language;
setting the current language to one of the one or more support languages when selected by a user at the terminal apparatus and displaying the screen for controlling the image forming apparatus using the selected one or more support languages; and
when no operation by the user continues for a certain time period or the user logs out of the terminal apparatus:
requesting, with the terminal apparatus, the default language from the image forming apparatus, receiving at the terminal apparatus, the default language from the image forming apparatus, and displaying the screen for controlling the image forming apparatus using the default language at the terminal apparatus.

10. An image forming method comprising storing linguistic information, including a default language and one or more support languages, by a terminal apparatus and connecting to the image forming apparatus via a communication unit and transmitting a control command to the image forming apparatus from the terminal apparatus;

setting a current language as the default language at the terminal apparatus;

transmitting the linguistic information including the default language from the terminal apparatus to the image forming apparatus and displaying a screen for controlling the image forming apparatus using the default language;

setting the current language to one of the one or more support languages at the terminal apparatus when selected by a user;

transmitting the one or more support languages selected by the user to the image forming apparatus from the terminal apparatus;

displaying the screen for controlling the image forming apparatus using the one or more support languages; and when no operation by the user continues for a certain time period or the user logs out of the terminal apparatus:

returning the current language to the default language at the terminal apparatus, and displaying the screen for controlling the image forming apparatus using the default language at the terminal apparatus.

* * * * *